US010886857B1

(12) United States Patent
Karsten (10) Patent No.: US 10,886,857 B1
(45) Date of Patent: Jan. 5, 2021

(54) INHIBITING NOISE COUPLING ACROSS ISOLATED POWER SUPPLIES (71) Applicant: Ralph R. Karsten, St. Paul, MN (US)

(72) Inventor: Ralph R. Karsten, St. Paul, MN (US)

(*) Notice: Subject to any disclaimer, the term of this patent is extended or adjusted under 35 U.S.C. 154(b) by 0 days.

(21) Appl. No.: 16/527,386

(22) Filed: Jul. 31, 2019

(51) Int. Cl.
*H02M 7/06* (2006.01)
*H01F 27/36* (2006.01)
*H01F 27/28* (2006.01)
*H01F 27/24* (2006.01)

(52) U.S. Cl.
CPC ............. *H02M 7/06* (2013.01); *H01F 27/24* (2013.01); *H01F 27/28* (2013.01); *H01F 27/36* (2013.01)

(58) Field of Classification Search
CPC ... H03F 1/307; H03F 1/26; H03F 3/00; H03F 3/217; H03F 3/28; H03F 3/38; H03F 3/181; H03F 3/3059; H03F 3/2173; H03F 3/2171; H02M 7/06; H01F 27/24; H01F 27/28; H01F 27/36
See application file for complete search history.

(56) References Cited

U.S. PATENT DOCUMENTS

| | | | | |
|---|---|---|---|---|
| 2,955,266 A | * | 10/1960 | Glasspool | H03C 1/58 332/172 |
| 3,244,960 A | * | 4/1966 | Stevens | H02M 7/068 363/126 |
| 3,444,457 A | * | 5/1969 | John | G05F 1/30 323/258 |
| 3,911,332 A | * | 10/1975 | Kunkel | H01F 27/323 361/270 |
| 3,963,975 A | * | 6/1976 | Gauper, Jr. | H01F 27/34 363/15 |
| 4,719,431 A | * | 1/1988 | Karsten | H03F 3/28 330/123 |
| 4,775,844 A | * | 10/1988 | Snyder | H03F 1/52 330/146 |
| 4,853,668 A | * | 8/1989 | Bloom | H01F 27/255 336/214 |
| 4,864,478 A | * | 9/1989 | Bloom | H01F 3/10 363/16 |
| 4,937,729 A | * | 6/1990 | Gadreau | H01F 27/2804 336/183 |
| 5,416,458 A | * | 5/1995 | Menke | H01F 27/34 336/12 |
| 5,598,325 A | * | 1/1997 | Pleitz | H02M 3/158 363/132 |

(Continued)

*Primary Examiner* — Thienvu V Tran
*Assistant Examiner* — Nusrat Quddus
(74) *Attorney, Agent, or Firm* — Kinney & Lange, P.A.

(57) ABSTRACT

Apparatus and associated methods relate to generating isolated DC power using a Faraday shielded transformer coupled with an AC/DC power converter. First and second Faraday shields are configured to attenuate capacitive coupling between primary and secondary windings of the Faraday shielded transformer. The first Faraday shield is conductively coupled to a first DC node of the AC/DC power converter. The second Faraday shield is conductively coupled to a second DC node of the AC/DC power converter. In some embodiments, the first and second Faraday shields are associated with the primary and secondary windings, respectively, of the transformer. In some embodiments, two such DC power sources can be used to provide operating power for a circlotron amplifier.

19 Claims, 5 Drawing Sheets

(56) References Cited

U.S. PATENT DOCUMENTS

| | | | | | |
|---|---|---|---|---|---|
| 5,731,969 | A | * | 3/1998 | Small | H02M 1/4216 |
| | | | | | 363/126 |
| 5,959,438 | A | * | 9/1999 | Jovanovic | H02M 1/34 |
| | | | | | 323/222 |
| 6,021,052 | A | * | 2/2000 | Unger | H02J 9/062 |
| | | | | | 363/133 |
| 6,087,822 | A | * | 7/2000 | van der Veen | H01F 27/385 |
| | | | | | 323/356 |
| 6,242,977 | B1 | * | 6/2001 | Karsten | H03F 3/181 |
| | | | | | 330/127 |
| 6,737,916 | B2 | * | 5/2004 | Luu | H03F 3/387 |
| | | | | | 330/10 |
| 6,747,513 | B1 | * | 6/2004 | Berry | H03F 3/3059 |
| | | | | | 330/146 |
| 7,187,233 | B1 | * | 3/2007 | Berry | H03F 3/20 |
| | | | | | 330/146 |
| 10,469,042 | B1 | * | 11/2019 | Karsten | H03F 3/217 |
| 2012/0140533 | A1 | * | 6/2012 | Li | H02J 3/32 |
| | | | | | 363/37 |
| 2014/0160820 | A1 | * | 6/2014 | McKinley | G01R 15/186 |
| | | | | | 363/126 |
| 2014/0334189 | A1 | * | 11/2014 | Yan | H02M 3/33584 |
| | | | | | 363/17 |
| 2015/0085534 | A1 | * | 3/2015 | Abramovitz | H02M 1/34 |
| | | | | | 363/21.01 |
| 2020/0152366 | A1 | * | 5/2020 | Frisvold | H01F 27/42 |

* cited by examiner

INHIBITING NOISE COUPLING ACROSS ISOLATED POWER SUPPLIES

BACKGROUND

Converting AC power to DC power can be performed in various manners. One such manner is to use a transformer to provide isolation between a primary side and a secondary side. Such isolation transformers can facilitate isolation of power domains between primary and secondary sides. For example, independent ground references can be maintained across such transformers. Transformers can be used to step-up or step-down a magnitude of AC power on the secondary side with respect to the primary side. Thus, the power provided by the secondary windings can have a different magnitude and reference voltage then the power provided to the primary winding.

The transformer typically has a magnetic core that couples a magnetic field generated by a primary winding to a secondary winding. The primary and secondary windings have parasitic capacitance as well. Thus, the current within and/or voltage across the secondary winding is responsive to the current within and voltage across the primary winding due to both coupling mechanisms (i.e., magnetic and capacitive). The frequency response of the two coupling mechanisms is dissimilar. For example, the capacitive coupling typically has less low-frequency response than the magnetic coupling. Thus, high-frequency noise on the primary winding can be transmitted to the secondary winding through capacitive coupling. Because of such phenomena, it is advantageous to reduce the capacitive coupling between the primary and secondary windings of an isolated power supply.

SUMMARY

Apparatus and associated methods relate to a system for providing isolated power. The system includes a transformer and an AC-to-DC power converter. The transformed includes a magnetic core, primary and secondary windings inductively coupled to the magnetic core, and first and second electrostatic isolation shields. The primary winding is configured to receive AC power and to induce an AC magnetic field within the magnetic core. The secondary winding is configured to generate AC current in the secondary winding in response to the AC magnetic field induced within the magnetic core. Each of the first and second electrostatic isolation shields is configured to provide capacitive isolation between the primary and secondary windings. The AC-to-DC power converter includes input and output ports. The input port is coupled to the secondary winding so as to receive the AC current generated in the secondary winding. The output port is configured to provide DC power to an output port. The AC-to-DC power converter is configured to generate the provided DC power from the received AC current. The first and second electrostatic isolation shields are electrically coupled to first and second DC nodes of the AC-to-DC power converter.

Some embodiments relate to a circlotron-configured system for producing amplification of a signal. The system includes a first control device having a control terminal and first and second output terminals. The first control device is configured to modulate conductivity between the first and second output terminals of the first control device based on a first control signal received at the control terminal of the first control device. The system includes a first isolated power supply having first and second output terminals. The first output terminal of the first isolated power supply is conductively coupled to the first output terminal of the first control device. The system includes a second control device having a control terminal and first and second output terminals. The second control device is configured to modulate conductivity between the first and second output terminals of the second control device based on a first control signal received at the control terminal of the second control device. The system includes a second isolated power supply having first and second output terminals. The first output terminal of the second isolated power supply is conductively coupled to the first output terminal of the second control device. The second output terminal of the first control device is conductively coupled to the second output terminal of the second isolated power supply. The second output terminal of the second control device is conductively coupled to the second output terminal of the first isolated power supply. Each of the first and second isolated power supplies includes a transformer and an AC-to-DC power converter. The transformer includes a magnetic core, primary and secondary windings, and first and second electrostatic isolation shields. The primary winding is inductively coupled to the magnetic core. The primary winding is configured to receive AC power and to induce an AC magnetic field within the magnetic core. The secondary winding is inductively coupled to the magnetic core so as to generate AC current in the secondary winding in response to the AC magnetic field induced within the magnetic core. Each of the first and second electrostatic isolation shields is configured to reduce capacitive coupling between the primary and secondary windings. The AC-to-DC power converter includes and input port and an output port. The input port is coupled to the secondary winding so as to receive the AC current generated in the secondary winding. The output port is configured to provide DC power to an output port. The AC-to-DC power converter is configured to generate the provided DC power from the received AC current. The first and second electrostatic isolation shields are electrically coupled to first and second DC nodes, respectively, of the AC-to-DC power converter.

Some embodiments relate to a method for providing isolated power. The method includes receiving, at a primary winding, AC power. Then, the secondary winding is inductively coupled to the primary winding via a magnetic core. An AC magnetic field is then induced within the magnetic core in response to the AC power received at the primary winding. Then AC current is generated in the secondary winding in response to the AC magnetic field induced within the magnetic core. Then, the secondary winding is shielded from the primary winding via first and second electrostatic isolation shields interposed between the primary and secondary windings. Then, DC power is generated, via an AC-to-DC power converter, from the received AC current. The the first and second electrostatic isolation shields are electrically coupled to first and second DC nodes, respectively, of the AC-to-DC power converter. Then, the generated DC power is provided to an output port.

DETAILED DESCRIPTION

Apparatus and associated methods relate to generating isolated DC power using a Faraday shielded transformer coupled with an AC/DC power converter. First and second Faraday shields are configured to attenuate capacitive coupling between primary and secondary windings of the Faraday shielded transformer. The first Faraday shield is conductively coupled to a first DC node of the AC/DC power converter. The second Faraday shield is conductively coupled to a second DC node of the AC/DC power converter. In some embodiments, the first and second Faraday shields are associated with the primary and secondary windings, respectively, of the transformer. In some embodiments, two such DC power sources can be used to provide operating power for a circlotron amplifier.

Figure 1:
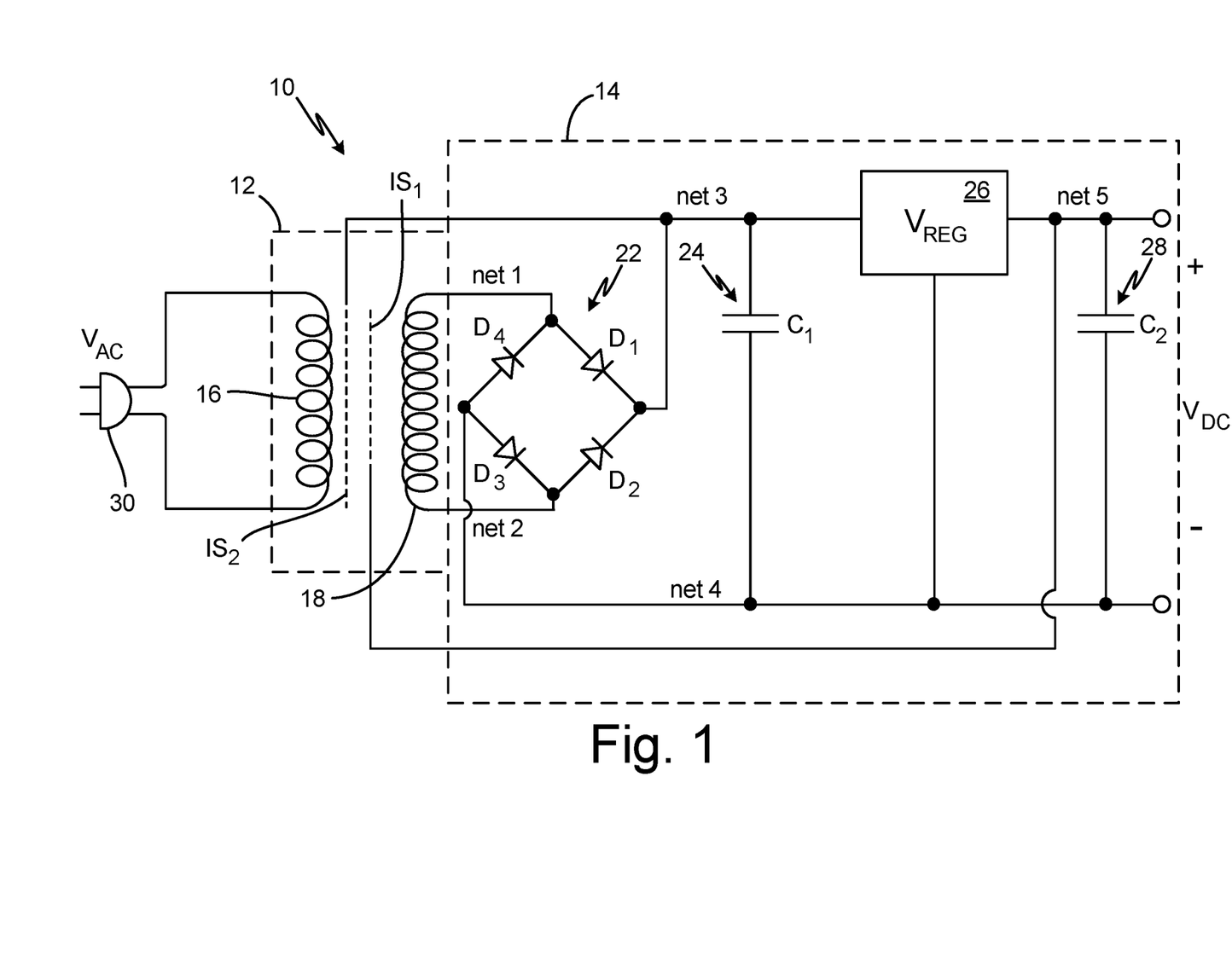
FIG. 1 is a schematic circuit diagram of an exemplary system for providing isolated DC power.

FIG. 1 is a schematic circuit diagram of an exemplary system for providing isolated DC power. In FIG. 1, isolated power converter 10 includes transformer 12 and AC-to-DC power converter 14. Transformer 10 includes primary winding 16, secondary winding 18, and a magnetic core (not depicted) configured to magnetically couple secondary winding 18 to primary winding 16. Transformer 10 also includes first electrostatic isolation shield $IS_1$ and second electrostatic isolation shield $IS_2$. First and second electrostatic isolation shields $IS_1$ and $IS_2$ are configured to reduce the capacitance between primary and secondary windings 16 and 18. The details of how this capacitive reduction is accomplished will be explained below.

AC-to-DC power converter 14 includes rectifier 22, first filter 24, regulator 26, and second filter 28. In the depicted embodiment, rectifier 22 is a full-bridge rectifier that includes rectifying diodes $D_1$-$D_4$. In the depicted embodiment, first filter 24 consists only of capacitor $C_1$. In the depicted embodiment, second filter 28 consists only of capacitor $C_2$. In various embodiments, rectifier 22 and first and second filters 24 and 28 can have different configurations. For example, first and/or second filters 24 and 28 can be configured as an LC filter or as a multi-stage filter.

In the depicted embodiment, primary winding 16 is configured to receive AC power from connector 30, and to induce an AC magnetic field within the magnetic core. Because secondary winding 18 is magnetically coupled, via the magnetic core, to primary winding 16, secondary winding 18 is configured to generate AC current in the secondary winding in response to the AC magnetic field induced within the magnetic core. Rectifier 22 is conductively coupled, via net 1 and net 2, shown in FIG. 1, to secondary winding 18, thereby enabling rectifier 22 to receive the AC current generated in secondary winding 18. Rectifier 22 is configured to rectify the received AC current and to provide the rectified AC current at output nodes of rectifier 22.

First filter 24 is conductively coupled, via net 3 and net 4, shown in FIG. 1, to the output nodes of rectifier 22, thereby enabling first filter 24 to receive the rectified AC current provided thereto. First filter 24 is configured to provide operating power therethrough, wherein the provided operating power has a voltage that has been filtered by first filter 24. Regulator 26 is conductively coupled, via net 3 and net 4, to first filter 24 so as to receive the filtered operating power. Regulator 26 can be a switched capacitor regulator or a linear regulator, for example. In some embodiments, regulator 26 can be a boost/buck regulator. Regulator 26 is configured to provide regulated operating power to output nodes of regulator 26. Second filter 28 is conductively coupled, via net 5 and net 4, to the output nodes of regulator 26, thereby enabling second filter 24 to receive the regulated power provided by regulator 26.

First and second electrostatic isolation shields $IS_1$ and $IS_2$ are electrically coupled, via net 3 and net 5, shown in FIG. 1, to DC nodes of AC-to-DC converter 14. In the depicted embodiment, first electrostatic isolation shield $IS_1$ is conductively coupled, via net 3, to the output of rectifier 22, to first filter 24 and to the input of regulator 26. In the depicted embodiment, second electrostatic isolation shield $IS_2$ is conductively coupled, via net 5, to the output of regulator 26, and to second filter 28. Noise at the output of power converter 10 can be reduced by such electrical coupling of first and second electrostatic isolation shields $IS_1$ and $IS_2$ to DC nodes (e.g., nets 3 and 5) of AC-to-DC converter 14.

Figure 2A:
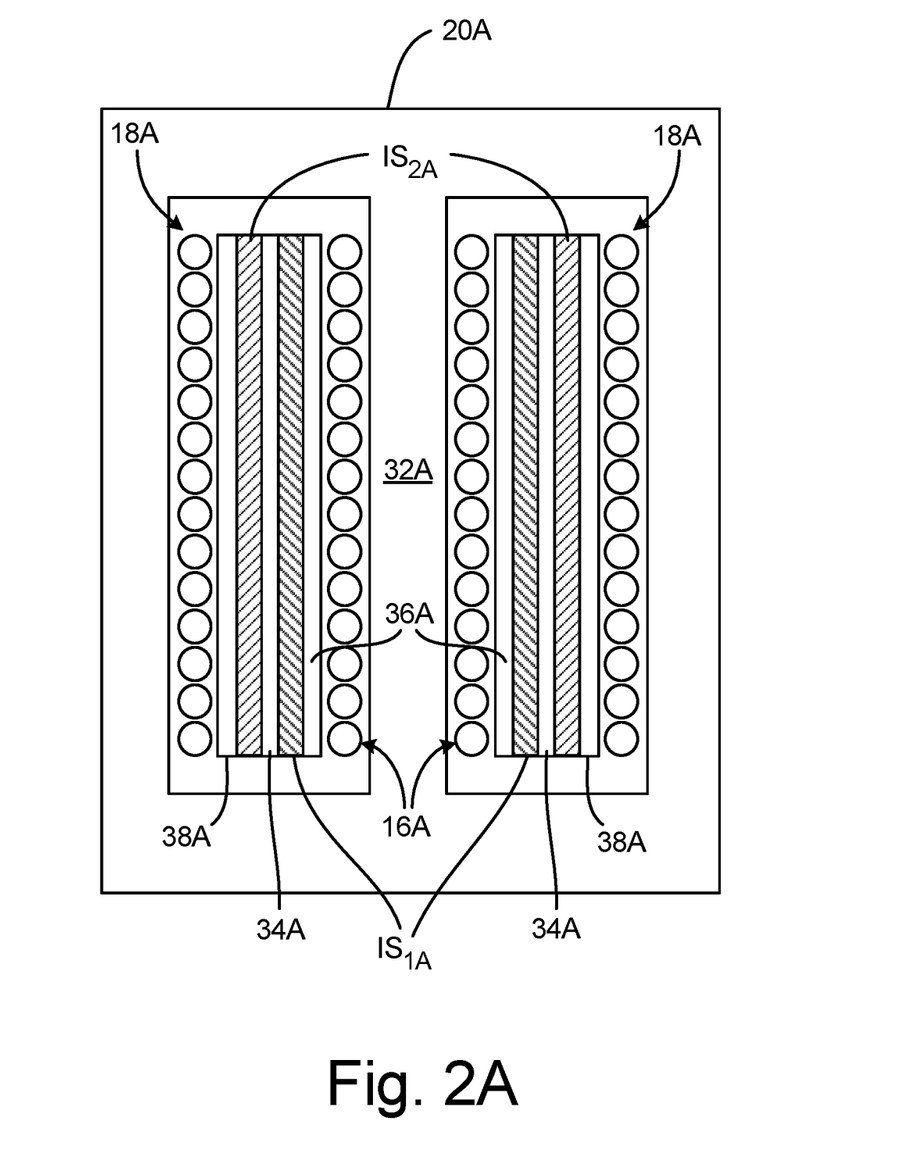
FIGS. 2A-2B are cross-sectional views of two embodiments of double Faraday shielded transformers.
Figure 2B:
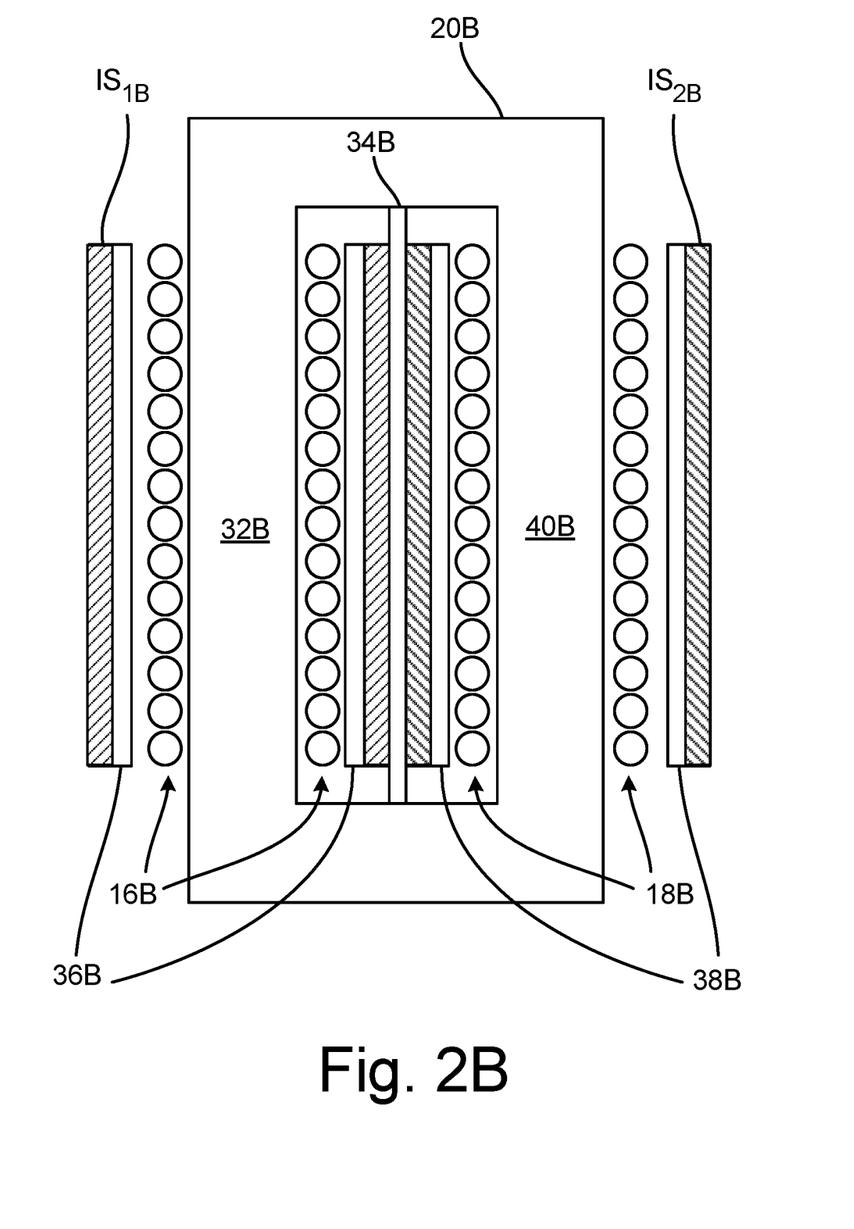

FIGS. 2A-2B are cross-sectional views of two embodiments of double Faraday shielded transformers. In FIG. 2A, double Faraday shielded transformer 10A includes primary winding 16A, secondary winding 18A, and magnetic core 20A configured to magnetically couple secondary winding 18A to primary winding 16A. Primary winding 16A is wound about portion 32A of magnetic core 20A. Transformer 10A also includes first electrostatic isolation shield $IS_{1A}$ and second electrostatic isolation shield $IS_{2A}$. First and second electrostatic isolation shields $IS_{1A}$ and $IS_{2A}$ are conductive foils that are electrically isolated from one another via interposing dielectric 34A. First and second electrostatic isolation shield $IS_{1A}$ and $IS_{2A}$ circumscribe primary winding 16A. First electrostatic isolation shield $IS_{1A}$ is electrically isolated from primary winding 16A via dielectric 36A. Secondary winding 18A is wound about primary winding 16A and first and second electrostatic isolation shields $IS_{1A}$ and $IS_{2A}$. Secondary winding 18A is electrically isolated from second electrostatic isolation shield $IS_{1A}$ via dielectric 38A. Electrostatic isolation shields $IS_{1A}$ and $IS_{2A}$, as depicted in the FIGS. 2A-2B embodiments, are sometimes referred to as Faraday shields. Such Faraday shields can attenuate noise coupling between primary winding 16A and secondary winding 18A. Noise that leaks past electrostatic isolation shield $IS_{1A}$ can be further attenuated by second shield $IS_{2A}$.

In FIG. 2B, double Faraday shielded transformer 10B includes primary winding 16B, secondary winding 18B, and magnetic core 20B configured to magnetically couple secondary winding 18B to primary winding 16B. Primary winding 16B is wound about portion 32B of magnetic core 20B. Secondary winding 18B is wound about portion 40B of magnetic core 20B. Transformer 10B also includes first electrostatic isolation shield $IS_{1B}$ and second electrostatic isolation shield $IS_{2B}$. First and second electrostatic isolation shields $IS_{1B}$ and $IS_{2B}$ are conductive foils that are electrically isolated from one another via interposing dielectric 34B. First electrostatic isolation shield $IS_{1A}$ circumscribes primary winding 16B. First electrostatic isolation shield $IS_{1B}$ is electrically isolated from primary winding 16B via dielectric 36B. Second electrostatic isolation shield $IS_{2B}$ circumscribes secondary winding 18B. Secondary winding 18B is electrically isolated from second electrostatic isolation shield $IS_{2B}$ via dielectric 38B. Various other configurations can be used to provide double shielding between primary windings 16A and 16B and secondary windings 18A and 18B, respectively.

Figure 3:
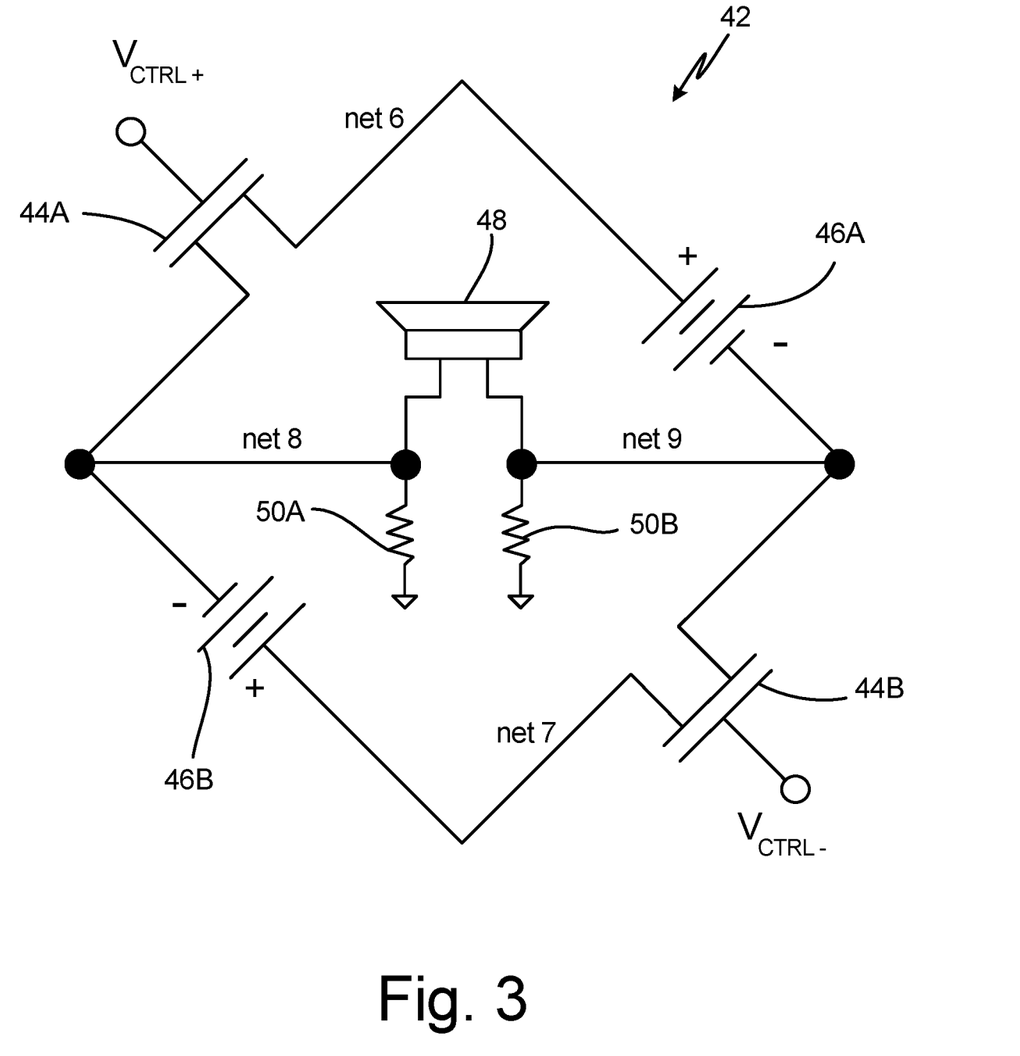
FIG. 3 is a schematic circuit diagram of a circlotron amplifier with two isolated DC power supplies such as that depicted in FIG. 1.

FIG. 3 is a schematic circuit diagram of a circlotron amplifier with two isolated DC power supplies, such as that depicted in FIG. 1. In FIG. 3, circlotron amplifier 42 includes modulation devices 44A and 44B and double Faraday isolated power supplies 46A and 46B. Circlotron amplifier 42 also includes load 48, which in the depicted embodiment is an audio speaker, and reference-setting resistors 50A and 50B. In the depicted embodiment, circlotron amplifier 42 has input nodes 52A and 52B and produces a signal, such as an audio signal, for example, as an output. Modulation device 44A is series connected, via net 6, shown in FIG. 3, with double Faraday isolated power supply 46A, and modulation device 44B is series connected, via net 7, shown in FIG. 3, with double Faraday isolated power supply 46B. Series-connected modulation device 44A and double Faraday isolated power supply 46A are connected, via net 8 and net 9, shown in FIG. 3, with series-connected modulation device 44B and double Faraday isolated power supply 46B in an anti-parallel fashion.

Load 48 is connected, via net 8 and net 9, to this antiparallel/series-connected arrangement of modulation devices 44A and 44B and double Faraday isolated power supplies 46A and 46B. Reference-setting resistors 50A and 50B couple net 8 and net 9, respectively, to a ground reference. In typical operation, modulation devices 44A and 44B are operated in a complementary fashion, so as to provide, based on a difference between control signals VCTRL+ and VCTRL− provided to control terminals of modulation devices 44A and 44B, a differential signal on net 8 and net 9. Use of double Faraday isolated power supplies 46A and 46B in such a circlotron amplifier 42 can advantageously reduce high-frequency noise transferred to load 48.

Figure 4:
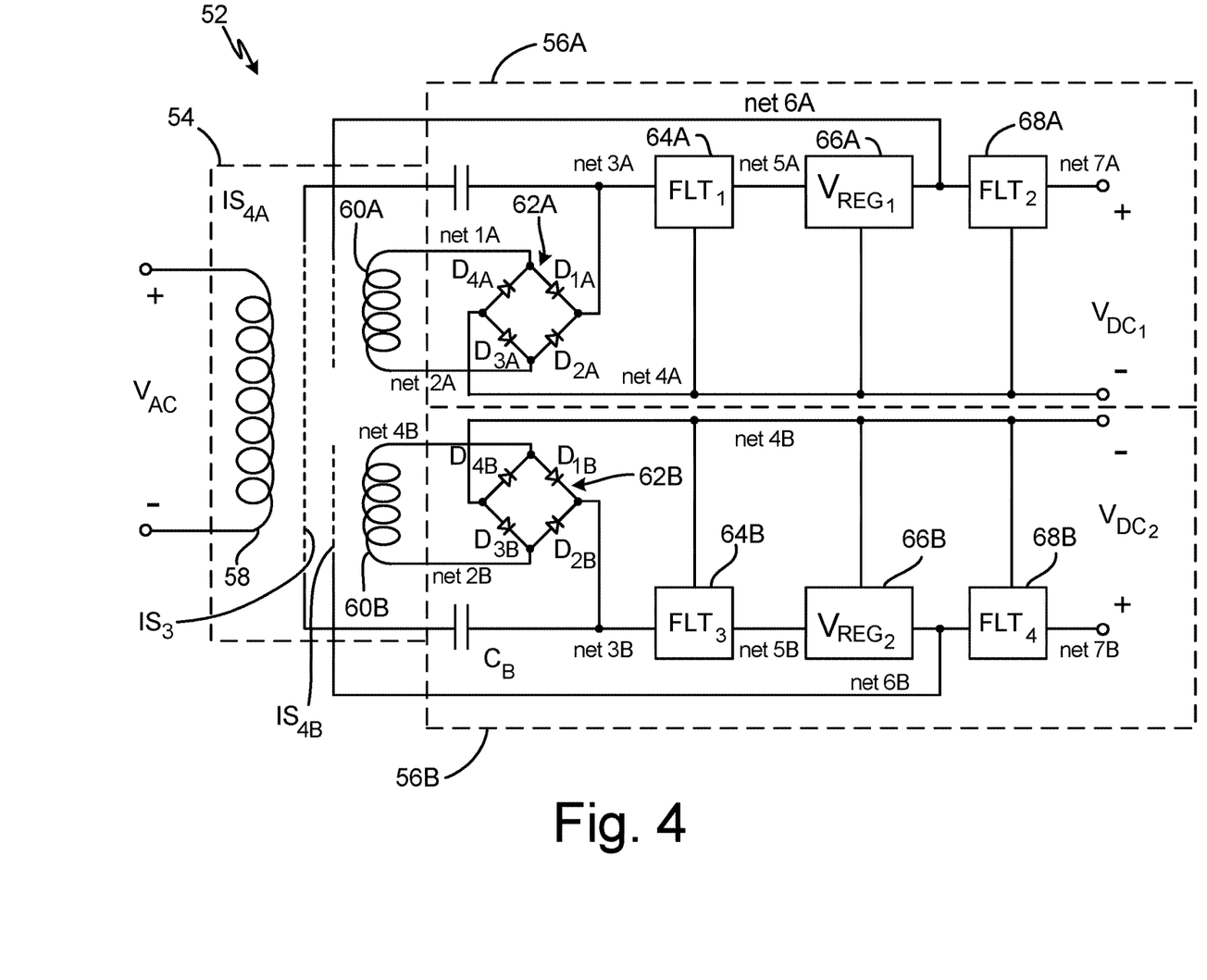
FIG. 4 is a schematic circuit diagram of an exemplary system for providing isolated DC power for two complementary power sources.

FIG. 4 is a schematic circuit diagram of an exemplary system for providing isolated DC power for two complementary power sources. In various circuitry that requires two identical isolated power supplies, such as circlotron amplifier 42 depicted in FIG. 3, dual-output double-Faraday isolated power supply 52 can be used. Dual-output double-Faraday isolated power supply 52 includes transformer 54 and first and second AC-to-DC power converters 56A and 56B. Transformer 54 includes primary winding 58, and secondary windings 60A and 60B, and a magnetic core (not depicted) configured to magnetically couple secondary windings 60A and 60B to primary winding 58. Transformer 54 also includes first electrostatic isolation shield $IS_3$ and second electrostatic isolation shields $IS_{4A}$ and $IS_{4B}$. First and second electrostatic isolation shields $IS_3$, $IS_{4A}$ and $IS_{4B}$ are configured to reduce the capacitance between primary and secondary windings 58 and 60A and 60B.

AC-to-DC power converters 56A and 56B include rectifiers 62A and 62B, first filters 64A and 64B (which in the depicted embodiment are simply filter capacitors), regulators 66A and 66B, and second filters 68A and 68B, respectively. In the depicted embodiment, rectifiers 62A and 62B are full-bridge rectifiers that include rectifying diodes $D_{1A}$-$D_{4A}$ and $D_{1B}$-$D_{4B}$, respectively. In the depicted embodiment, the power flow is from rectifiers 62A and 62B to first filters 64A and 64B, to regulators 66A and 66B, and to second filters 68A and 68B, respectively.

In the depicted embodiment, primary winding 58 is configured to receive AC power from input terminals $V_{AC+/-}$, as shown in FIG. 4, and to induce an AC magnetic field within the magnetic core. Because secondary windings 60A and 60B are magnetically coupled, via the magnetic core, to primary winding 58, secondary windings 60A and 60B are configured to generate AC current in secondary windings 60A and 60B in response to the AC magnetic field induced within the magnetic core. Rectifiers 62A and 62B are conductively coupled, via nets 1A-2A and nets 1B-2B to secondary windings 60A and 60B, respectively, thereby enabling rectifiers 62A and 62B to receive the AC current induced in secondary windings 60A and 60B. Rectifiers 62A and 62B are configured to rectify the received AC currents and to provide the rectified AC currents at output nodes of rectifiers 62A and 62B.

First filters 64A and 64B are conductively coupled, via nets 3A-4A and nets 3B-4B, to the output nodes of rectifiers 64A and 64B, respectively, thereby enabling first filters 64A and 64B to receive the rectified AC currents provided thereto. First filters 64A and 64B are configured to provide operating power therethrough, wherein the provided operating power has a voltage that has been filtered by first filters 64A and 64B. Regulators 66A and 66B are conductively coupled, via nets 4A-5A and nets 4B-5B, as shown in FIG. 4, to first filters 64A and 64B, respectively, so as to receive the filtered operating power. Regulators 66A and 66B are configured to provide regulated operating power to output nodes of regulators 66A and 66B. Second filters 68A and 68B are conductively coupled, via nets 4A, 6A and nets 4B, 6B, as shown in FIG. 4, to the output nodes of regulators 66A and 66B, respectively, thereby enabling second filters 68A and 68B to receive the regulated power provided by regulators 66A and 66B, respectively.

First electrostatic isolation shield $IS_3$ is capacitively coupled to nets 3A and 3B, and second electrostatic isolation shields $IS_{4A}$ and $IS_{4B}$ are conductiveley coupled, via net s6A and net 6B, to DC nodes of AC-to-DC converters 56A and 56B, as shown in FIG. 4. Noise at the complementary outputs of dual-output double-Faraday isolate power supply 52 can be reduced by such electrical coupling of first and second electrostatic isolation shields $IS_3$, $IS_{4A}$ and $IS_{4B}$ to DC nodes (e.g., nets 3A-3B and nets 6A-6B) of AC-to-DC converters 56A and 56B, as shown in FIG. 4.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for providing isolated power, the system comprising:
 a transformer including:
  a magnetic core;
  a primary winding inductively coupled to the magnetic core, the primary winding configured to receive AC power and to induce an AC magnetic field within the magnetic core;
  a secondary winding inductively coupled to the magnetic core so as to generate AC current in the secondary winding in response to the AC magnetic field induced within the magnetic core; and
  first and second electrostatic isolation shields, each configured to provide capacitive isolation between the primary and secondary windings; and
 an AC-to-DC power converter including:
  an input port coupled to the secondary winding so as to receive the AC current generated in the secondary winding; and
  an output port configured to provide DC power to an output port, wherein the AC-to-DC power converter is configured to generate the provided DC power from the received AC current, and wherein the first and second electrostatic isolation shields are electrically coupled to first and second DC nodes, respectively, of the AC-to-DC power converter, wherein the first electrostatic isolation shield is located between the second electrostatic isolation shield and the primary winding of the transformer.

2. The system of claim 1 wherein the first and second electrostatic isolation shields are interposed between the primary and secondary windings of the transformer.

3. The system of claim 2, wherein the first isolation field is located between the second isolation field and the secondary winding of the transformer.

4. The system of claim 1, wherein the AC-to-DC power converter further includes:
a rectifier having an input port and an output port, the input port coupled to the secondary winding so as to receive the AC current generated in the secondary winding, the rectifier configured to rectify the AC current so as to provide rectified DC power at the output port of the rectifier.

5. The system of claim 4, wherein the first electrostatic isolation shield is electrically coupled to the output port of the rectifier.

6. The system of claim 4, wherein the rectifier is a full-bridge rectifier.

7. The system of claim 4, wherein the AC-to-DC power converter further includes:
a low-pass filter having an input port and an output port, the input port coupled to the output port of the rectifier so as to receive the rectified DC power, the low-pass filter configured to provide filtered rectified DC power at the output port of the low-pass filter.

8. The system of claim 7, wherein the AC-to-DC power converter further includes:
a power regulator having an input port and an output port, the input port coupled to the output port of the low-pass filter so as to receive the filtered rectified DC power, the power regulator configured to provide regulated DC power at the output port of the power regulator.

9. The system of claim 8, wherein the second electrostatic isolation shield is conductively coupled to the output port of the power regulator.

10. The system of claim 8, wherein the low-pass filter is a first low-pass filter, the AC-to-DC power converter further includes:
a second low-pass filter having an input port and an output port, the input port coupled to the output port of the power regulator so as to receive the regulated DC power, the second low-pass filter configured to provide filtered regulated DC power at the output port of the second low-pass filter.

11. The system of claim 1, wherein each of the first and second electrostatic isolation shields includes a conductive foil.

12. The system of claim 11, wherein the conductive foil comprises copper.

13. The system of claim 1, wherein the transformer further comprises:
an insulator between first and second electrostatic isolation shields so as to conductively isolate first and second electrostatic isolation shields from one another.

14. The system of claim 1, wherein the first electrostatic isolation shield circumscribes the primary winding so as to sandwich the primary winding between the first electrostatic isolation shield and a first portion of the conductive core about which the primary winding is wound.

15. The system of claim 14, wherein the second electrostatic isolation shield circumscribes the first electrostatic isolation shield and the secondary winding is wound about the first electrostatic isolation shield.

16. The system of claim 14, wherein the second electrostatic isolation shield circumscribes the secondary winding so as to sandwich the secondary winding between the second electrostatic isolation shield and a second portion of the conductive core about which the secondary winding is wound.

17. A circlotron-configured system for producing amplification of a signal, the system comprising:
a first control device having a control terminal and first and second output terminals, the first control device configured to modulate conductivity between the first and second output terminals of the first control device based on a first control signal received at the control terminal of the first control device;
a first isolated power supply having first and second output terminals, the first output terminal of the first isolated power supply conductively coupled to the first output terminal of the first control device;
a second control device having a control terminal and first and second output terminals, the second control device configured to modulate conductivity between the first and second output terminals of the second control device based on a first control signal received at the control terminal of the second control device;
a second isolated power supply having first and second output terminals, the first output terminal of the second isolated power supply conductively coupled to the first output terminal of the second control device;
wherein the second output terminal of the first control device is conductively coupled to the second output terminal of the second isolated power supply, and
wherein the second output terminal of the second control device is conductively coupled to the second output terminal of the first isolated power supply,
wherein each of the first and second isolated power supplies comprises:
a transformer including:
a magnetic core;
a primary winding inductively coupled to the magnetic core, the primary winding configured to receive AC power and to induce an AC magnetic field within the magnetic core;
a secondary winding inductively coupled to the magnetic core so as to generate AC current in the secondary winding in response to the AC magnetic field induced within the magnetic core; and
first and second electrostatic isolation shields, each configured to reduce capacitive coupling between the primary and secondary windings; and
an AC-to-DC power converter including:
an input port coupled to the secondary winding so as to receive the AC current generated in the secondary winding; and
an output port configured to provide DC power to an output port,
wherein the AC-to-DC power converter is configured to generate the provided DC power from the received AC current, and wherein the first and second electrostatic isolation shields are electrically coupled to first and second DC nodes, respectively, of the AC-to-DC power converter.

18. A method for providing isolated power, the method comprising:
receiving, at a primary winding, AC power;
inductively coupling, via a magnetic core, a secondary winding to the primary winding;
inducing, in response to the AC power received at the primary winding, an AC magnetic field within the magnetic core;
generating, in response to the AC magnetic field induced within the magnetic core, AC current in the secondary winding;
shielding, via first and second electrostatic isolation shields interposed between the primary and secondary windings, the secondary winding from the primary winding, wherein the first electrostatic isolation shield is located between the second electrostatic isolation shield and the primary winding;
generating, via an AC-to-DC power converter, DC power from the received AC current;
electrically coupling the first and second electrostatic isolation shields to first and second DC nodes, respectively, of the AC-to-DC power converter;
providing the generated DC power to an output port.

19. The method of claim 18, wherein electrically coupling the second electrostatic isolation shields to the second DC node of the AC-to-DC power converter comprises:
conductively coupling the second electrostatic isolation shield to an output port of a power regulator.

* * * * *